Jan. 7, 1941.  C. BANCROFT  2,228,193
ROTARY DISPLACEMENT MEANS
Filed Dec. 16, 1939  2 Sheets-Sheet 1
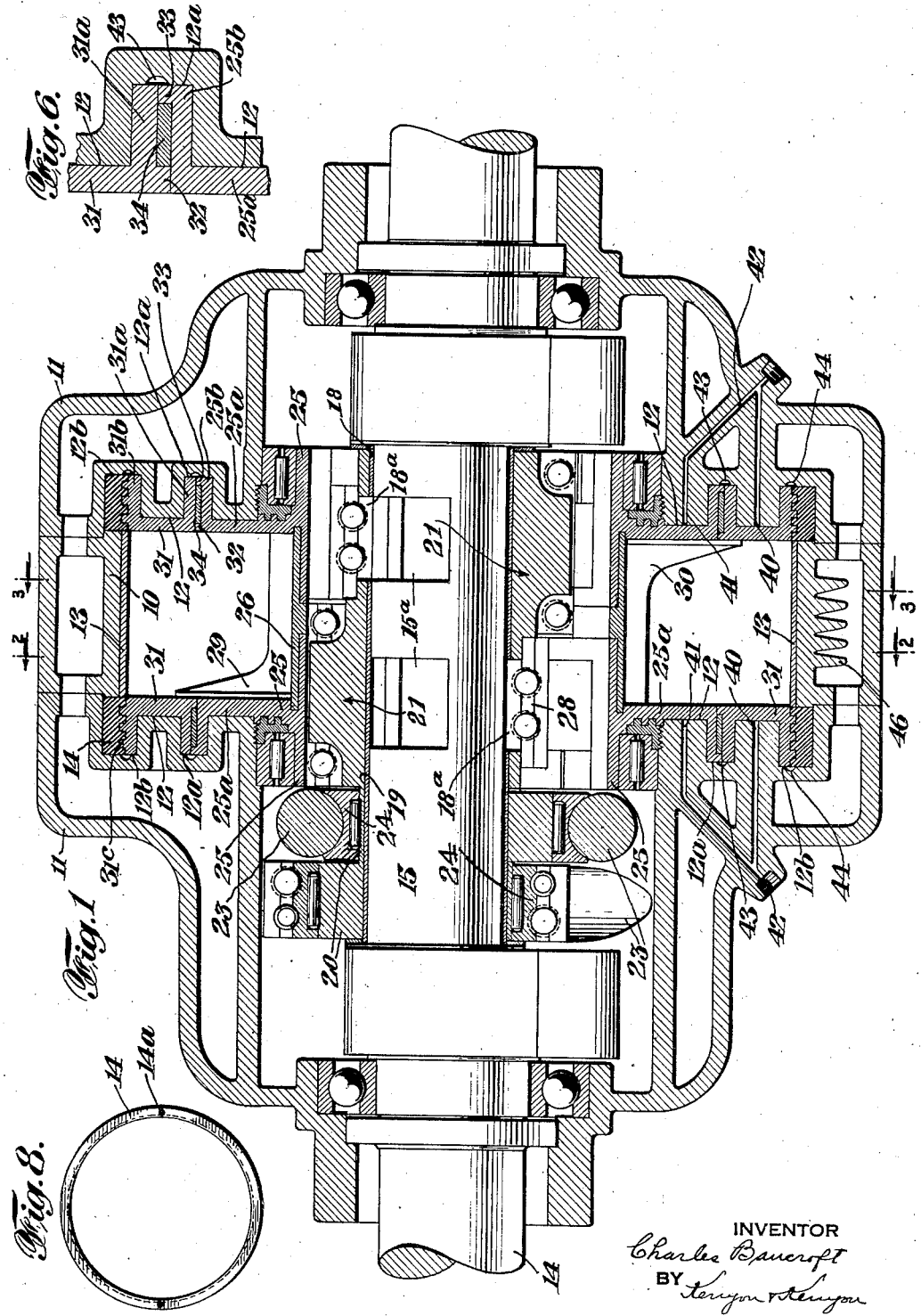
INVENTOR
Charles Bancroft
BY
Kenyon & Kenyon
ATTORNEYS.

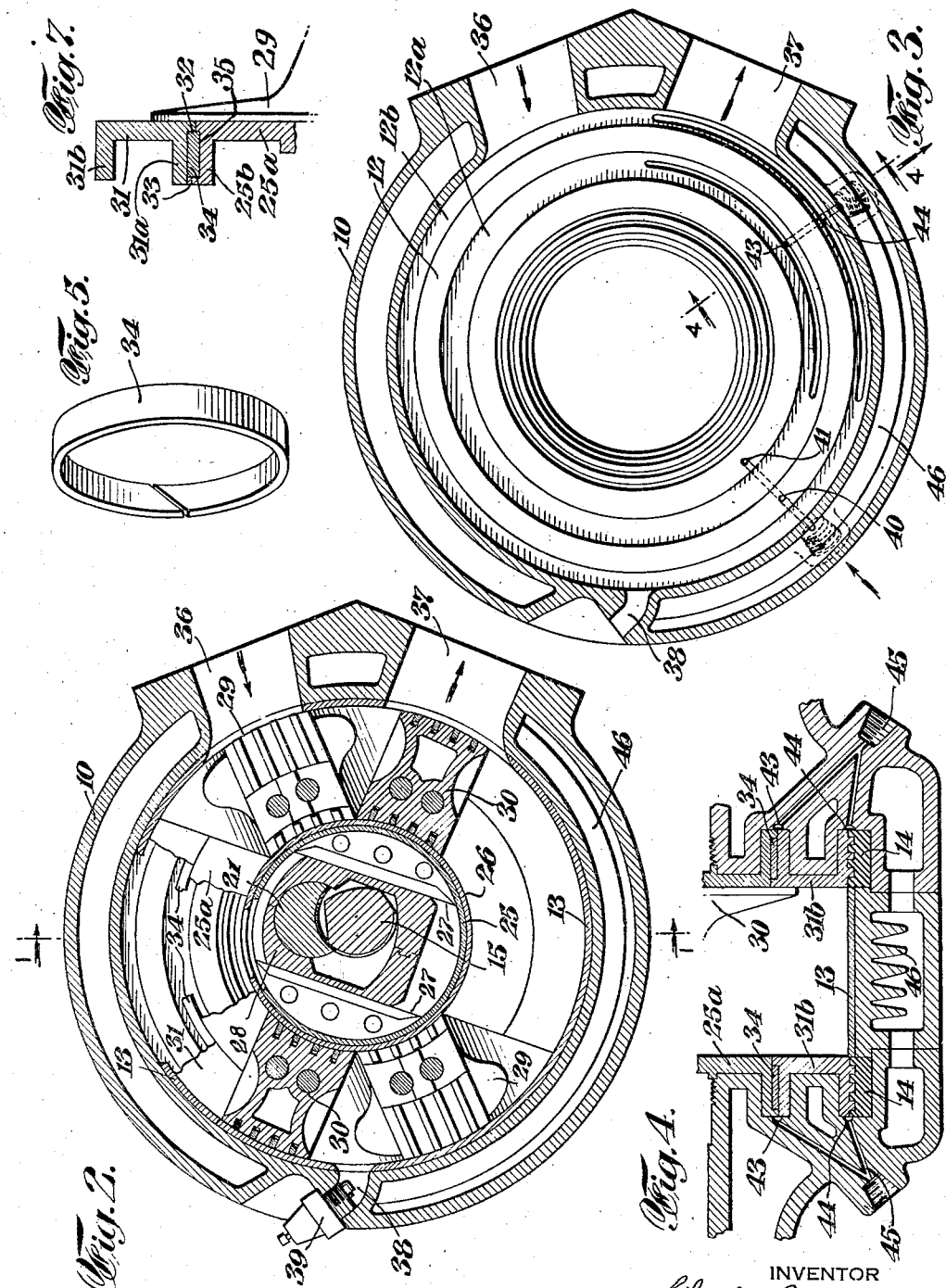

Patented Jan. 7, 1941

2,228,193

UNITED STATES PATENT OFFICE 2,228,193

ROTARY DISPLACEMENT MEANS

Charles Bancroft, New Canaan, Conn.

Application December 16, 1939, Serial No. 309,537

14 Claims. (Cl. 123—11)

This invention relates to rotary displacement means and more particularly to a gearless rotary displacement device of the alternately accelerating piston type, such as disclosed in the patent to Bancroft, No. 2,132,596. In such a device, each side wall of the displacement chamber comprises two concentric annular members, of which one is connected to one pair of pistons and the other is connected to the remaining pair of pistons. When such a device is operated as an internal combustion engine, a portion of each annular member is subjected to severe outward pressure during the explosion cycle, tending to warp it, resulting in binding it against the enclosing casing.

An object of this invention is to provide means for counteracting the warping effect on the annular members of the outward pressure of the explosion cycle, thereby avoiding resulting binding.

Other objects, novel features and advantages of this invention will become apparent from the following specification and accompanying drawings, wherein:

Fig. 1 is an axial section through a device embodying the invention, substantially on the line 1—1 of Fig. 2 with slight orientation of the piston driving means for the sake of better illustration;

Fig. 2 is a section on the line 2—2 of Fig. 1, partially broken away.

Fig. 3 is a section on the line 3—3 of Fig. 1 of the casing only;

Fig. 4 is a fragmentary section on the line 4—4 of Fig. 3;

Fig. 5 is a perspective view of one element of the structure;

Fig. 6 is an enlarged fragmentary section;

Fig. 7 is a similar section illustrating a modification, and

Fig. 8 is an elevation of a part.

In so far as possible, the various elements of the device herein illustrated will be referred to by the same reference characters as in said Patent No. 2,132,596 and only those parts of the device immediately involved in the present invention will be described in detail, reference being had to said patent for description of the parts not herein described in detail.

The engine casing comprises a cylinder 10 and two suitably shaped end sections 11 having opposed faces 12. The end sections are clamped to the cylinder by means (not shown) and in the casing is journalled a crank shaft 14 having a crank pin 15. A bushing 18 surrounds the crank pin 15 and constitutes a bearing for a rotatable member 19 provided with two disks 20 eccentric to the crank pin and arcuate bearing pads 21. Two pairs of rectilinear guide rods 23 are arranged in the casing at right angles to each other and a block 24 is associated with each pair of guide rods for rectilinear reciprocation, each block having an aperture in which is received an eccentric disk 20. Cylindrical members 25 are rotatably supported by the casing sections 11 concentric with the crank shaft and each cylindrical member is provided with a diametrically arranged rectilinear guideway 27 in which is slidably arranged a block 28 having an aperture enclosing the member 19 in alinement with a bearing pad 21, a portion of the apertured surface being of the proper curvature to journal a bearing pad 21 while the remainder of the aperture is of such size and shape as to permit limited relative rotary movement between the block 28 and the member 19 while preventing any relative rectilinear movement, the crank pin and bearing 18 being notched at 15a and 18a respectively to provide suitable clearances. The mechanism just described operates in the same manner as set forth in said Patent No. 2,132,596 to cause rotation of the crank shaft upon rotation of the cylindrical members. A sealing ring 26 overlies said cylindrical members each of which is provided with a flange 25a slidably engaging a face 12 and a hardened steel liner 13 is provided on the inner face of the cylinder 10. In the circular channel defined by the ring 26 and flanges 25 are provided two pairs of pistons 29 and 30, one pair of pistons being fastened to one flange 25a and the other pair of pistons being fastened to the other flange 25a. To each pair of pistons is fastened a ring 31 which snugly encloses a flange 25a and engages a face 12. The cylinder 10 and its liner 13 forms a ring cylinder with the flanges 25a, rings 31 and sealing ring 26. Each face 12 is provided with annular recesses 12a and 12b into which project annular ribs 31a and 31b of the ring 31 and a flanged annular rib 25b of the flange 25a also projects into the recess 12a. In the outer surface of the flange 31b are provided alternate ribs and grooves 31c for fitting alternate grooves and ribs in a ring 14 mounted in a casing section 11 (Figs. 1 and 8). The ring 14 is composed of two equal sections which are held in assembled relation to the casing section by bolts or studs 14a (Fig. 8) supported by the casing section and seated in semicircular recesses in each section of each half of the ring 14. The co-operating ribs and grooves of the rings 31 and the rings 14 oppose flow of lubricant from the bottom of the recess 12 into the ring cylinder and the flow of fluids from the ring cylinder into the recess 12.

Each rib 31a is formed with a cylindrical surface terminating in a shoulder 32 near the inner portion of the rib and each rib 25a is formed with a cylindrical surface terminating in a shoulder 33 adjacent the outer portion of the rib, thereby forming an annular passageway of rectilinear cross-section between each rib 25b and 31a (Fig. 6). In the passageway just referred to is located a split ring 34 of the same cross-section as the passageway. The ring 34 serves to provide support for each of the annular members 25 and 31a between their points of attachment to the pistons. This arrangement tends to overcome outward warping of the walls of the ring cylinder under the pressure developed between the pistons following the explosion cycle. Fuel is admitted to the ring cylinder through the inlet 36 and exhaust gases are discharged through the outlet 37. In the passageway 38 provided in the casing and opening into ring cylinder is located a spark plug 39.

In each casing section are provided two passageways 40 and 41 terminating in the face 12 at points substantially midway of the edges of the annular members 31 and 25a. Each of these passageways communicates with a port 42 to which oil is supplied under pressure through a suitably connected conduit. The location of the inlet ends of the passageways 40 and 41 is proper to supply pressure to the back walls of the members 25a and 31 at the points where these members are subjected to the greatest strains in the explosion cycle. Oil collecting grooves 43 are provided in the base of each recess 12a along the line of contact of the surfaces of the ribs 31a and 25b and similar grooves 44 are provided in the base of each recess 12b along the line of contact of the rings 14 and the flange 31b. Passageways 45 lead from such grooves to a port to which is connected a suitable conduit (not shown). The pressure supplied to the rear surface of the ring cylinder walls by the oil counteracts the effect of the explosion pressure and obviates any tendency of the ring cylinder walls to warp into binding relation against the casing faces 12. The grooves 43 and 44 may be either complete circles or less than complete circles, depending upon conditions and serve to provide an escape passage for any oil that may find its way into the recesses 12a and 12b, thereby preventing passage of such oil between the surfaces of the ribs 25b and 31a and the surfaces of the rib 31b and the ring 14 into the ring cylinder.

In Fig. 7 is illustrated a modification in which the rib 25b is provided with a groove 35, one wall of which is formed by the shoulder 33 and the other wall of which is formed by a flange on the rib of less height than the shoulder 33. Also, in this modification, the shoulder 32 is of correspondingly less thickness than in Fig. 6, so as to define an annular passageway of rectilinear cross-section for the ring 34. In this modification, the ring 34 has to be spread slightly in order to assemble it on the rib 25b.

Preferably, cooling fins or flanges 46 are provided on the inner wall of the water jacket formed in the cylinder 10 over the portion thereof adjacent that section of the ring cylinder in which the explosion cycle occurs. The passageways 45 may, if desired, be connected to a vacuum pump or the like to insure removal of oil collected in the grooves 43 and 44.

Although the invention has been above described particularly in connection with an internal combustion engine, it is to be understood that the invention is equally applicable to other embodiments of a gearless rotary displacement device of the alternately accelerating piston type. Furthermore, it is to be understood that modifications may be made in the structure above described without in any way departing from the spirit of the invention as defined in the appended claims.

I claim:

1. In an internal combustion engine of the character described, a pair of rotatable cylindrical members, a first annular member carried by each cylindrical member, a second annular member surrounding each first annular member, each first and second annular member together constituting one wall of a ring cylinder concentric with said cylindrical members, a first pair of pistons connected to one first annular member and to the opposite second annular member, a second pair of pistons connected to the remaining first annular member and the remaining second annular member, supporting members engaging the outer faces of said ring cylinder walls, means for exploding a gas charge contained in said ring cylinder between successive pistons, and means co-operating with each annular member to restrict axial distortion thereof during the explosion cycle.

2. In an internal combustion engine of the character described, a pair of rotatable cylindrical members, a first annular member carried by each cylindrical member, a second annular member surrounding each first annular member, each first and second annular member together constituting one wall of a ring cylinder concentric with said cylindrical members, a first pair of pistons connected to one first annular member and to the opposite second annular member, a second pair of pistons connected to the remaining first annular member and the remaining second annular member, means for exploding a gas charge contained in said ring cylinder between successive pistons, and means interconnecting each first and second annular member to prevent relative axial movement thereof in one direction.

3. In an internal combustion engine of the character described, a pair of rotatable cylindrical members, a first annular member carried by each cylindrical member, a second annular member surrounding each first annular member, each first and second annular member together constituting one wall of a ring cylinder concentric with said cylindrical members, a first pair of pistons connected to one first annular member and to the opposite second annular member, a second pair of pistons connected to the remaining first annular member and the remaining second annular member, means for exploding a gas charge contained in said ring cylinder between successive pistons, opposed shoulders on each pair of first and second annular members, and a ring interposed between said shoulders.

4. In an internal combustion engine of the character described, a pair of rotatable cylindrical members, a first annular member carried by each cylindrical member, a second annular member surrounding each first annular member, each first and second annular member together constituting one wall of a ring cylinder concentric with said cylindrical members, a first pair of pistons connected to one first annular member and to the opposite second annular member, a second pair of pistons connected to the remaining first annular member and the remaining second annular member, supporting members engaging the outer faces of said ring cylinder walls, means for exploding a gas charge contained in said ring cylinder between successive pistons, a passageway through each supporting member for supplying liquid under pressure between said member and the outer face of each annular member.

5. In an internal combustion engine of the character described, a pair of rotatable cylindrical members, a first annular member carried by each cylindrical member, a second annular member surrounding each first annular member, each first and second annular member together constituting one wall of a ring cylinder concentric with said cylindrical members, a first pair of pistons connected to one first annular member and to the opposite second annular member, a second pair of pistons connected to the remaining first annular member and the remaining second annular member, and a ring surrounding each second annular member, each ring and second annular member having inter-engaging alternate grooves and ribs.

6. In an internal combustion engine of the character described, a pair of rotatable cylindrical members, a first annular member carried by each cylindrical member, a second annular member surrounding each first annular member, each first and second annular member together constituting one wall of a ring cylinder concentric with said cylindrical members, a first pair of pistons connected to one first annular member and to the opposite second annular member, a second pair of pistons connected to the remaining first annular member and the remaining second annular member, supporting members engaging the outer faces of said ring cylinder walls, means for exploding a gas charge contained in said ring cylinder between successive pistons, a passageway through each supporting member for supplying liquid under pressure between said member and the outer face of each annular member, and a ring surrounding each second annular member, each ring and annular member having inter-engaging grooves and ribs.

7. In a rotary displacement device of the character described, a pair of rotatable cylindrical members, a first annular member carried by each cylindrical member, a second annular member surrounding each first annular member, each first and second member together constituting one wall of a ring cylinder concentric with said cylindrical members, a first pair of pistons connected to one first annular member and to the opposite second annular member, a second pair of pistons connected to the remaining first annular member and the remaining second annular member, supporting members engaging the outer faces of said ring cylinder walls, and means cooperating with each annular member to restrict axial distortion thereof under pressure.

8. In a rotary displacement device of the character described, a pair of rotatable cylindrical members, a first annular member carried by each cylindrical member, a second annular member surrounding each first annular member, each first and second member together constituting one wall of a ring cylinder concentric with said cylindrical members, a first pair of pistons connected to one first annular member and to the opposite second annular member, a second pair of pistons connected to the remaining first annular member and the remaining second annular member, and means interconnecting each first and second annular member to prevent relative axial movement thereof in one direction.

9. In a rotary displacement device of the character described, a pair of rotatable cylindrical members, a first annular member carried by each cylindrical member, a second annular member surrounding each first annular member, each first and second annular member together constituting one wall of a ring cylinder concentric with said cylindrical members, a first pair of pistons connected to one first annular member and to the opposite second annular member, a second pair of pistons connected to the remaining first annular member and the remaining second annular member, opposed shoulders on each pair of first and second annular members, and a ring interposed between said shoulders.

10. In a rotary displacement device of the character described, a pair of rotatable cylindrical members, a first annuar member carried by each cylindrical member, a second annular member surrounding each first annular member, each first and second annular member together constituting one wall of a ring cylinder concentric with said cylindrical members, a first pair of pistons connected to one first annular member and to the opposite second annular member, a second pair of pistons connected to the remaining first annular member and the remaining second annular member, supporting members engaging the outer faces of said ring cylinder walls, and a passageway through each supporting member for supplying liquid under pressure between said supporting member and the outer face of the associated annular member.

11. In a rotary displacement device of the character described, a pair of rotatable cylindrical members, a first annular member carried by each cylindrical member, a second annular member surrounding each first annular member, each first and second annular member together constituting one wall of a ring cylinder concentric with said cylindrical members, a first pair of pistons connected to one first annular member and to the opposite second annular member, a second pair of pistons connected to the remaining first annular member and the remaining second annular member, and a ring surrounding each second annular member, each ring and second annular member having interengaging alternate grooves and ribs.

12. In a rotary displacement device of the character described, a pair of rotatable cylindrical members, a first annular member carried by each cylindrical member, a second annular member surrounding each first annular member, each first and second annular member together constituting one wall of a ring cylinder concentric with said cylindrical members, a first pair of pistons connected to one first annular member and to the opposite second annular member, a second pair of pistons connected to the remaining first annular member and the remaining second annular member, supporting members engaging the outer faces of said ring cylinder walls, a passageway through each supporting member for supplying liquid under pressure between said member and the outer face of the associated annular member and a ring surrounding each second annular member, each ring and annular member having inter-engaging grooves and ribs.

13. In a device of the character described, a pair of rotatable cylindrical members, a first annular member carried by each cylindrical member, a second annular member concentric with said first annular member and together therewith constituting one wall of a ring cylinder concentric with said cylindrical members, a first pair of pistons connected to one first annular member and to the opposite second annular member, a second pair of pistons connected to the remaining first annular member and the remaining second annular member, supporting members engaging the outer faces of said ring cylinder walls, and a passageway through each supporting member for supplying liquid under pressure between said supporting member and the outer face of the associated ring cylinder wall.

14. In a device of the character described, a pair of rotatable cylindrical members, a first annular member carried by each cylindrical member, a second annular member concentric with said first annular member and together therewith constituting one wall of a ring cylinder concentric with said cylindrical members, a first pair of pistons connected to one first annular member and to the opposite second annular member, a second pair of pistons connected to the remaining first annular member and the remaining second annular member, supporting members engaging the outer faces of said ring cylinder walls, a passageway through each supporting member for supplying liquid under pressure between said supporting member and the outer face of the associated ring cylinder wall, and a ring surrounding each outer annular member, each ring and annular member having interengaging grooves and ribs.

CHARLES BANCROFT.